(12) United States Patent
Shembel et al.

(10) Patent No.: US 6,803,152 B2
(45) Date of Patent: Oct. 12, 2004

(54) NONAQUEOUS ELECTROLYTES BASED ON ORGANOSILICON AMMONIUM DERIVATIVES FOR HIGH-ENERGY POWER SOURCES

(75) Inventors: Elena M. Shembel, Dnepropetrovsk (UA); Oleg V. Chervakov, Dnepropetrovsk (UA); Natalya I. Globa, Dnepropetrovsk (UA); Peter Novak, Antwerp (BE)

(73) Assignee: ENER1 Battery Company, Ft. Lauderdale, FL (US)

( * ) Notice: Subject to any disclaimer, the term of this patent is extended or adjusted under 35 U.S.C. 154(b) by 237 days.

(21) Appl. No.: 10/126,340

(22) Filed: Apr. 19, 2002

(65) Prior Publication Data

US 2003/0215720 A1 Nov. 20, 2003

(51) Int. Cl.[7] .................................... H01M 10/40
(52) U.S. Cl. ................... 429/326; 429/200; 429/307; 429/316; 429/329; 429/330; 429/337; 429/338; 429/339; 429/340; 429/341; 429/342; 29/623.1
(58) Field of Search ................... 429/199, 200, 429/201, 307, 316, 324, 325, 326, 327, 328, 329, 330, 331, 332, 333, 334, 335, 336, 337, 338, 339, 340, 341, 342, 343; 29/623.1, 62.2

(56) References Cited

U.S. PATENT DOCUMENTS

| 4,882,244 A | * | 11/1989 | Donahue et al. ............. 429/339 |
| 6,171,522 B1 | | 1/2001 | Michot et al. ............... 423/593 |
| 6,395,367 B1 | | 5/2002 | Michot et al. ............. 428/64.8 |
| 6,569,573 B1 | * | 5/2003 | Mikhaylik et al. .......... 429/324 |
| 2002/0009650 A1 | | 1/2002 | Michot et al. ............... 429/314 |

FOREIGN PATENT DOCUMENTS

JP 5-343076 * 12/1993 .......... H01M/10/40

* cited by examiner

Primary Examiner—Stephen J. Kalafut
(74) Attorney, Agent, or Firm—Akerman Senterfitt (57) ABSTRACT

A nonaqueous electrolyte additive includes an organosilicon backbone including at least one ethylene oxide ($CH_2CH_2O$) unit, at least two pyridinium groups bound to the backbone, the pyridinium groups each bound to at least one halogen ion or halogen-containing anion. The additive is useful for forming improved liquid and polymer electrolytes for lithium ion and lithium metal batteries.

24 Claims, 8 Drawing Sheets

FIG. 1

| Polymer electrolyte | Conductivity, Sm/cm² | | |
|---|---|---|---|
| | Storage time, day | | |
| | 0 | 1 | 5 |
| C-PVC:PC:LiClO₄ (1:5:0.21)* | 0.070 | 0.090 | 0.060 |
| C-PVC:PC:LiClO₄:additive VII (1:5:0.21:0.16) | 0.110 | 0.100 | 0.120 |

*In the brackets the mass ratio of the components is given.

NONAQUEOUS ELECTROLYTES BASED ON ORGANOSILICON AMMONIUM DERIVATIVES FOR HIGH-ENERGY POWER SOURCES

CROSS REFERENCE TO RELATED APPLICATION

Not applicable.

STATEMENT AS TO FEDERALLY SPONSORED RESEARCH

Not applicable.

1. Field of the Invention

The invention generally relates organic liquid and polymer electrolytes for rechargeable batteries and electrochemical capacitors. More particularly, the invention relates to organosilicon ammonium derivatives for use as electrolyte additives.

2. Background

The demand for new and improved electronic devices such as cellular phones, notebook computers and compact camcorders has resulted in demand for energy storage devices having increasingly higher specific energy densities. A number of advanced battery technologies have recently been developed to service these devices, such as metal hydride (e.g., Ni—MH), lithium batteries with liquid electrolytes and recently, lithium batteries with polymer electrolytes.

Lithium batteries have been introduced into the market because of their high energy densities. Lithium is atomic number three on the periodic table of elements, having the lightest atomic weight and highest energy density of any solid material. As a result, lithium is a preferred material for batteries, having very high energy density. Lithium batteries are also desirable because they have a high unit cell voltage of up to approximately 4.2 V, as compared to approximately 1.5 V for both Ni—Cd and Ni—MH cells.

Lithium batteries can be either lithium ion batteries or lithium metal batteries. Lithium ion batteries intercalate lithium ions in a host material, such as graphite, to form the anode. On the other hand, lithium metal batteries use metallic lithium for the anode.

The electrolyte used in lithium batteries can be a liquid or a polymer electrolyte. Lithium batteries having liquid electrolytes have been on the market for several years. Lithium batteries having solid polymer electrolytes are comparatively new entries into the marketplace.

The electrochemical operation of a lithium battery is essentially the same whether a liquid electrolyte or polymer electrolyte is used, and is based on the anode and cathode materials used. In the case of a lithium ion battery, the battery works by the rocking chair principle, that is, charging and discharging, allowing lithium ions to "rock" back and forth between cathode and anode and for lithium ions to be involved with the intercalation-deintercalation process on the active electrode material surfaces.

During the cycling of a lithium-metal battery the following processes occur. While discharging, lithium dissolution takes place at the metal lithium anode, and results in passing lithium ions into the electrolyte. On the cathode during discharging, intercalation of lithium ions into the solid phase occurs. During the charging of a lithium-metal battery, lithium cations deintercalate from the solid phase cathode, and the deposition of metal lithium takes place on the metal lithium anode from lithium ions in the nonaqueous liquid electrolyte.

Many performance parameters of lithium batteries are associated with the electrolyte choice, and the interaction of the selected electrolyte with the cathode and anode materials used. Most devices require electrolytes to provide high conductivity and electrochemical stability over a broad range of temperatures and potentials. The electric conductivity (specific and molecular or equivalent) is one of the most important properties of electrolytes. High electrolyte ionic conductivity leads to improved battery performance. Thus, significant research has focused on developing methods for increasing electrolyte conductivity and also its chemical and electrochemical stability in electrochemical cells.

Electrolytes generally include one or more aprotic solvents, at least one salt and may also contain optional electrolyte additives. The ionic conductivity of such systems is substantially determined by interaction between the salt and the solvent and by the resulting values of the ion mobilities in liquid electrolyte systems and ion mobilities in the intermolecular spaces for plasticized polymer electrolyte systems. When selecting the composition of the electrolyte system it is generally necessary to choose solvents with a low viscosity.

One known way to increase the ionic conductivity of electrolyte solutions is through the use of mixed solvents. Using laws of ion dissociation, dielectric permeability and viscosity applied to electrolyte conductivity, it is possible to select improved compositions of solvent and solution. Thus, theoretical considerations make it possible to select solvents which provide a high constant for electrolytic dissociation in nonaqueous media.

One of the components of the mixed solvent can be regarded as a solvating agent, which supplies the system with solvation energy necessary for the appropriate ion pair formation. The second component determines a sufficiently high dielectric permeability, which is essential for the disintegration of ion pairs with the formation of free solvated ions. It is well known that in mixed solvents, alkali metal halogenides dissociate much better than in each solvent component separately.

Modifying additives can be effective in increasing the ionic conductivity and stability of nonaqueous electrolytes. Additives vary in both their chemical nature and the mechanisms of their influence. Among these additives, nitrogen containing ones, such as ternary amines and certain ammonium compounds, have been reported to produce improved electrolytes. Ternary amines have been shown to be capable of considerably increasing the solvating activity of aprotic solvents. Ternary amines in an electrolyte $PEO_4$ (polyethylene oxide) with acrylonitrile and LiCl (or LiBr or LiI) have been shown to increase the Li ion conductivity by up to two orders of magnitude [X. Q. Yang, H. S. Lee, J. McBreen, L. S. Choi, Y. Okamoto. The Ion Pair Effect of Aza-based Anion Receptors on Lithium Salts in Polymer Electrolytes, In Proceeding Fall Meeting, San-Antonio, Tex., Oct. 6–11, 1996, Meeting abstract, Abstr. N76]. The mentioned ternary amines were introduced into the solution in equimolar amounts in relation to the lithium salts. This increase in conductivity can be partly attributed to the formation of anion complexes ($Cl^-$, $Br^-$, I) with the nitrogen containing additives and the formation of complexes of $Li^+$ ions with ether oxygen in $PEO_4$. These processes make the dissociation of lithium salts into ions more effective.

The use of ternary amines, in particular tributylamine as additives into 1,3-dioxolane and $LiAsF_6$ based nonaqueous electrolytes have been reported (D. Aurbach, E. Zinigrad, H.

Teller, P. Dan, J. Electrochem. Soc., 147 (4) 1274–1279 (2000)). As far as the modifying activity is concerned, the authors related the influence of tributylamine to its antipolymerization activity preventing the polymerization of 1,3-dioxolane. Such an approach is effective when fluorine containing lithium salts like $LiBF_4$, $LiAsF_6$ and $LiPF_6$ are used in nonaqueous electrolytes as ion-conducting additives. During operation, the lithium salts breakdown forming the inorganic acid HF. This acid in turn initiates the polymerization of the organic solvent. Thus, stabilization of the electrolyte's properties is obtained at the expense of HF acceptance by ternary amines.

Even with available electrolyte additives, conventional electrolytes for lithium secondary batteries do not provide sufficient ionic conductivity for many applications and/or are not stable enough for most applications with lithium metal secondary batteries or lithium ion secondary batteries. This is principally because previous additives have been directed at improving only one aspect of electrolyte performance, such as ionic conductivity or cycling efficiency. Moreover, conventional electrolytes cannot generally provide a lithium secondary battery having satisfactory cycling characteristics, such as charge-discharge efficiency, cycle lifetime and the like.

SUMMARY

A group of pyridinium based compounds includes an organosilicon backbone containing at least one ethylene oxide ($CH_2CH_2O$) unit, and at least two pyridinium groups bound to the backbone, the pyridinium groups each bound at least one halogen ion or halogen-containing anion. As used herein, a pyridinium group is defined as by the following general structure:

where $X^-$ is a halogen ion or a halogen containing anion, $R_2$ and $R_3$ are selected from hydrocarbons, hydrogen or nitrogen containing heterocyclic substituents.

The compounds can be use as an additive for forming improved liquid and polymer electrolytes and for the formation of lithium ion and lithium metal batteries having enhanced properties. When used to form a nonaqueous liquid electrolyte, the electrolyte is formed by combining the additive with an aprotic solvent. When used to form a nonaqueous polymer electrolyte, the electrolyte is formed by combining the additive with a polymer matrix and an aprotic solvent.

The electrolytes may include other optional components. The additive can have the following general structure:

where n is an integer from 1 to 9, $X^-$ is preferably selected from $Cl^-$, $Br^-$, $I^-$, $ClO_4^-$, $BF_4^-$, $AsF_6^-$, $PF_6^-$, $CF_3SO_3^-$, $CF_3CF_2CF_2SO_3^-$ and $N(CF_3SO_2)_2$, $R_1$ are aliphatic or aromatic hydrocarbons, $R_2$ and $R_3$ are hydrocarbons, hydrogen or nitrogen containing heterocyclic substituents (e.g., $C_5H_4N$ (pyridine)). Preferably, $R_1$, $R_2$ and $R_3$ are selected in the following combinations:

a) $R_1=CH_3$, $R_2=R_3=H$;
b) $R_1=CH_3$, $R_2=2-CH_3$, $R_3=H$;
c) $R_1=CH_3$, $R_2=4-CH_3$, $R_3=H$;
d) $R_1=CH_3$, $R_2=5-(CH_2=CH-)$, $R_3=2-CH_3$;
e) $R_1=CH_3$, $R_2=4-(CH_2=CH-)$, $R_3=H$;
f) $R_1=CH_3$, $R_2=4-C_5H_4N$, $R_3=H$;
g) $R_1=C_6H_5$, $R_2=R_3=H$;
h) $R_1=C_6H_5$, $R_2=2-CH_3$, $R_3=H$;
i) $R_1=C_6H_5$, $R_2=4-CH_3$, $R_3=H$;
j) $R_1=C_6H_5$, $R_2=5-(CH_2=CH-)$, $R_3=2-CH_3$;
k) $R_1=C_6H_5$, $R_2=4-(CH_2=CH-)$, $R_3=H$; and
l) $R_1=C_6H_5$, $R_2=4-C_5H_4N$, $R_3=H$.

In a more preferred embodiment, the additive has the following general structure:

Liquid and polymer electrolytes can include the salt of an alkali metal. The salt can be selected from the group consisting of $LiClO_4$, $LiBF_4$, $LiAsF_6$, $LiCF_3SO_3$ and $LiN(CF_3SO_2)_2$.

Aprotic solvents for liquid and polymer electrolytes can include acetonitrile, dimethylformamide, dimethylsulfoxide, propylene carbonate, ethylene carbonate, dimethyl carbonate, bis(2-methoxyethyl) ether, gamma butyrolactone, 1,3-dioxolane, dimethoxyethane or sulfolane. In this embodiment, 0.05 to 5 weight percent of the electrolyte is preferably provided by the additive.

In the polymer electrolyte embodiment, the aprotic solvent can comprise 40 to 82 weight percent of the electrolyte, while polymeric matrix can comprise 10 to 40 weight percent of the electrolyte. The polymer matrix can be a halogen-containing polymer. For example, the halogen-containing polymer can be polyvinyl chloride, chlorinated polyvinyl chloride or polyvinylidene fluoride.

An electrochemical cell includes an alkali metal or alkali ion containing anode, a cathode, and the additive containing the electrolyte of claim 1 or the additive containing electrolyte including the polymer matrix of claim 8. The electrochemical cell can be a rechargeable cell. If the anode is a lithium metal anode, the lithium metal anode can be lithium alloy. In this embodiment, the lithium alloy can be lithium-aluminum, lithium-aluminum-silicon, lithium-aluminum-cadmium, lithium-aluminum-bismuth or lithium-aluminum-tin.

In the lithium ion embodiment, the anode can include carbon. The carbon is preferably graphite.

The cathode for the lithium metal cell can be a metal oxide, such as $MnO_2$, $CuO$, $V_2O_5$, $V_6O_{13}$ or $TiS_2$. The cathode for the lithium ion cell can be a metal oxide, such as $LiMn_2O_4$, $LiCoO_2$, $LiNiO_2$ or $LiV_xO_y$.

A method of forming a liquid electrolyte includes the steps of providing an aprotic solvent, the salt of an alkali metal and an organosilicon additive. A method of forming a polymer electrolyte includes the steps of providing composition a polymeric matrix, an aprotic solvent and the salt of an alkali metal and an organosilicon additive. The additive includes an organosilicon backbone including at least one ethylene oxide ($CH_2CH_2O$) unit and at least two pyridinium groups bound to the backbone, the pyridinium groups each bound to at least one halogen ion or halogen-containing anion. The above components are then mixed together.

A method of making an electrochemical cell includes the steps of providing an anode including an alkali metal or alkali ion and providing a cathode of an electrochemically active material. A nonaqueous liquid electrolyte is placed between the anode and the cathode with using a porous separator, such as a polypropylene separator. A nonaqueous polymer electrolyte is operatively associated with the anode and cathode. The nonaqueous liquid and polymer electrolyte includes at least one ion-forming alkali salt. An organosilicon additive is combined into the electrolyte. The additive includes an organosilicon backbone including at least one ethylene oxide ($CH_2CH_2O$) unit and at least two pyridinium groups bound to the backbone, the pyridinium groups each bound to at least one halogen ion or halogen-containing anion.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

The invention relates to organosilicon electrolyte additives for nonaqueous liquid and polymer electrolytes for batteries including primary and rechargeable batteries, as well as electrochemical capacitors. More particularly, the electrolyte additives described herein include an organosilicon backbone and at least two pyridinium groups bound to the backbone.

The term "backbone" is understood herein to refer to the main chain of atoms in a molecule. The invention allows production of liquid and polymer electrolytes which provide high ionic conductivity and improved stability for lithium metal secondary batteries or lithium ion secondary batteries. The invention also provides enhanced cycling characteristics, such as charge-discharge efficiency and cycle lifetime.

The above-described additives have been found to improve electrolyte performance in several areas. Preferred species of these compounds provide simultaneous availability of ethylene oxide groups and tertiary and quaternary atoms of nitrogen, which allow the additive to provide beneficial multifunctional effects. The desirable properties are believed to be due the simultaneous presence of specific structural properties in the additives.

Quaternary nitrogen atoms provided by the invention have been reported to increase the ionic conductivity of nonaqueous electrolytes based on both aprotic solvents and polymer electrolytes [Makoto Ue, Masayuki Takeda, Masahiro Takehara, Shoichiro Mori, Properties of New Quaternary Ammonium Salts for Electrochemical Capacitors, In proceeding Fall Meeting, San-Antonio, Tex., Oct. 6–11, 1996, Meeting abstract, Abstr. N705].

Ether oxygen provided by the invention from the Si—O—C and C—O—C bonds in ethylene oxide have been shown to provide nonaqueous electrolytes high values of the donor number. Accordingly, the presence of these bonds favors a high solvating ability with respect to lithium salts, as it was observed while adding di(ethylene glycol)dimethyl ether to ethylene carbonate based electrolytes [I. Geoffray et al., Electrochimica Acta, 45 (2000) 2019–2029]. Finally, as noted in the background, the presence of ternary amines have been shown to increase the ionic conductivity by up to two orders of magnitude. The invention provides molecules which supply all the above beneficial structures to provide simultaneous multifunctional electrolyte enhancement effects.

Applied to lithium metal and lithium ion batteries, the additives described herein provide increased ionic conductance for liquid or polymeric nonaqueous electrolytes, increased cycling efficiency for secondary lithium batteries and increased electrochemical stability of nonaqueous electrolytes while functioning in both lithium and lithium-ion systems.

In one embodiment of the invention, the organosilicon ammonium additives can be represented as follows:

where n is an integer from 1 to 9, $X^-$ is preferably selected from $Cl^-$, $Br^-$, $I^-$, $ClO_4^-$, $BF_4^-$, $AsF_6^-$, $PF_6^-$, $CF_3SO_3^-$, $CF_3CF_2CF_2SO_3^-$ and $N(CF_3SO_2)_2^-$, $R_1$ are aliphatic or aromatic hydrocarbons, $R_2$ and $R_3$ are hydrocarbons, hydro- gen or nitrogen containing heterocyclic substituents (e.g., $C_5H_4N$ (pyridine)). Preferably, $R_1$, $R_2$ and $R_3$ may be selected in the following combinations:

$R_1=CH_3$, $R_2=R_3=H$;
$R_1=CH_3$, $R_2=2\text{-}CH_3$, $R_3=H$;
$R_1=CH_3$, $R_2=4\text{-}CH_3$, $R_3=H$;
$R_1=CH_3$, $R_2=5\text{-}(CH_2\!=\!CH\!-\!)$, $R_3=2\text{-}CH_3$;
$R_1=CH_3$, $R_2=4\text{-}(CH_2\!=\!CH\!-\!)$, $R_3=H$;
$R_1=CH_3$, $R_2=4\text{-}C_5H_4N$, $R_3=H$;
$R_1=C_6H_5$, $R_2=R_3=H$;
$R_1=C_6H_5$, $R_2=2\text{-}CH_3$, $R_3=H$;
$R_1=C_6H_5$, $R_2=4\text{-}CH_3$, $R_3=H$;
$R_1=C_6H_5$, $R_2=5\text{-}(CH_2\!=\!CH\!-\!)$, $R_3=2\text{-}CH_3$;
$R_1=C_6H_5$, $R_2=4\text{-}(CH_2\!=\!CH\!-\!)$, $R_3=H$; and (I–IV)

where I–IV are bis(dichloromethylsilyl) ethyleneglycolethers with n=1 (for I), n=2 (for II), n=3 (for III) and n=5 (for IV).

Intermediate products I–IV can be used to produce new organosilicon ammonium compounds by using an amination reaction of bis(dichloromethylsilyl)ethyleneglycolethers obtained as described with an excess of 4,4'-dipyridyl:

$R_1=C_6H_5$, $R_2=4\text{-}C_5H_4N$, $R_3=H$.

As noted above, anions can be molecular halogen containing anions. One method for producing additives having molecular anions is through the two (2) step process shown below.

In the first step, an initial ammonium containing compound is mixed with an alkali agent to result in an intermediate ylide form. In the second stage, an ammonium compound with a desired anion is obtained when the ylide intermediate is mixed with an acid (e.g. $HClO_4$) which includes the desired anion (e.g. $ClO_4^-$).

A preferred additive is the group of species described as organosilicon derivatives of 4,4'-dipyridyl. This group of species can be formed using the two step synthesis method shown below.

In the first step, several types of bis(dichloromethylsilyl) ethyleneglycolethers can be obtained by reaction of ethyleneglycol, di-, tri- or pentaethyleneglycols with chloromethyl(dimethyl)chlorosilane as shown below:

where V–VIII are organosilicon ammonium derivatives of 4,4'-dipyridyl with n=1 (for V), n=2 (for VI), n=3 (for VII), n=5 (for VIII).

Any salt known in the art, such as lithium salt or the like may be used with the present invention. Examples of some useful lithium salts include inorganic salts of lithium such as $LiPF_6$, $LiC/O_4$, $LiAsF_6$, $LiBF_4$, $LiAlCl_4$, $LiCl$, $LiBr$, $LiI$, and organic salts of lithium such as $CF_3CF_2CF_2SO_3Li$, $CH_3SO_3Li$, $CF_3SO_3Li$, $LiB(C_6H_5)_4$, $CF_3COOLi$, and $LiN(SO_2CF_3)_2$. These lithium salts may be used either alone or in a mixture.

An aprotic solvent can be used with the present invention to form an electrolyte solution, the aprotic solvent preferably being an organic solvent. Solvents with high dielectric constant and solvents with low viscosity may be used either alone or in a mixture thereof. However, in order to compensate for the low charge-discharge efficiency generally associated with solvents having low viscosity, it is preferable to use a solvent having a high dielectric constant in combination with a solvent with low viscosity. The solvents may be selected from acetonitrile, dimethylformamide, dimethylsulfoxide, propylene carbonate, ethylene carbonate, dimethyl carbonate, bis(2-methoxyethyl) ether, gamma butyrolactone, 1,3-dioxolane, dimethoxyethane and sulfolane, Preferably, the aprotic solvent comprises approximately 40–82% by weight of electrolyte.

The organosilicon additives can be used in liquid and polymer electrolytes for both primary and secondary power sources, for example, Li metal and lithium-ion power sources. The additives are useful with a variety of cathode materials which permits formation of power sources which produce a wide range of cell voltages. For example, 1.5 V to 4.0 V power sources can be formed using cathodes based on CuO, $MnO_2$, $V_xO_y$ ($V_2O_5$, $V_6O_{13}$ type), $MnO_2$, $Li_xMn_yO_z$ ($LiMn_2O_4$ type), $LiNiO_2$, $LiCoO_2$, and or materials such as polyviologenes, polyacetylene, polypyrrol, polythiophen.

Anode compositions which can be used with the invention include graphite lithium intercalation compounds for lithium ion cells, metallic lithium and lithium alloys with a lithium content of approximately 75–85 wt %, such as lithium-aluminum, lithium-aluminum-silicon, lithium-aluminum-cadmium, lithium-aluminum-bismuth and lithium-aluminum-tin.

A variety of polymers may be used with the invention. For example, polyvinyl chloride (PVC) and polyvinylidene fluoride. However, a preferred modified polymer material for use with the invention for polymer electrolyte applications is described in copending U.S. patent application Ser. No. 10/038,556 filed on Jan. 4, 2002 entitled SOLID POLYMER ELECTROLYTE LITHIUM BATTERY.

In that application, a polymer electrolyte and methods for making the same is described which includes a modified polymeric material. This copending application is assigned to the same assignee as the instant application and is hereby incorporated by reference in its entirety in this application. The modified polymeric material includes a halogen containing polymer having an enhanced halogen level, the enhanced halogen level relative to a halogen content of the halogen containing polymer formed from polymerization of its monomer. The halogen containing polymer is preferably polyvinylchloride (PVC) obtained by emulsion or suspension polymerization of vinylchloride. In the case of chlorination of PVC, the resulting modified polymer material preferably has 60–72 wt % chlorine as compared to the approximately 58.4 wt % which results from the polymerization of the monomer ethylene chloride (vinyl chloride). As used herein, "Chlorinated PVC" refers to a modified PVC polymer having 60–72 wt % chlorine.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

EXAMPLES

The present invention is further illustrated by the following specific examples. The examples are provided for illustration only and are not to be construed as limiting the scope of the invention in any way.

Example 1

In a round-bottom chemical flask 7.09 g (0.0454 moles) of 4,4'-dipyridyl and 8 ml dimethylacetamide, with 5 g (0.01816 moles) of bis(dichloromethylsilyl)-ethyleneglycol ether were heated for 100 hours at 60° C. Initially, the solution darkened, then a brown deposit was formed from the acetone-hexane mixture (1:1 v/v). The deposit (organosilicon ammonium derivatives of 4,4'-dipyridyl V) was thoroughly washed with acetone and dried under vacuum in an exicator. 5.49 g (0.093 moles) of the salt V with a melting temperature 110° C. was received in the form of an amorphous hygroscopic powder with a light brown color and which is soluble in water, dimethylsulfoxide, methanol and in aprotic solvents like propylene carbonate, but which is not soluble in aliphatic ethers or in ketones. The deposit was analyzed. The content of Cl was determined to be 12.01%, N 9.63%. Theoretical chlorine and nitrogen contents $C_{28}H_{36}Cl_2N_4O_2Si_2$ are Cl=12.06% and N=9.53%. IR (neat; KBr plates): —CH— (of the pyridine ring) 3028, 680 cm$^-$, Py 1650–1585 cm$^-$, Si(CH$_3$)$_2$ 1255, 820 cm$^-$, Si—CH$_3$ 800 cm$^{-1}$, Si—O—C 1010 cm$^{-1}$.

Example 2

In a round-bottom chemical flask 5.37 g (0.0344 moles) of 4,4'-dipyridyl and 8 ml dimethylacetamide with 5 g (0.01376 moles) of bis(dichloromethylsilyl) triethyleneglycolether III were heated for 100 hours at 60° C. Initially, the solution darkened, then a brown deposit was formed from an acetone-hexane mixture (1:1 v/v). This deposit (organosilicon ammonium derivatives of 4,4'-dipyridyl VII) was thoroughly washed with acetone and dried under vacuum in an exicator. 3.72 g (0.055 moles, 43%) of the salt VII with a melting temperature 105° C. were received in the form of an amorphous hygroscopic powder with a light brown color and which is soluble in water, dimethylsulfoxide, methanol and in aprotic solvents like propylene carbonate, but which is not soluble in aliphatic ethers or in ketones. The experimentally determined Cl content was 10.33%, N 8.33% Theoretical chlorine and nitrogen contents for $C_{32}H_{44}Cl_2N_2O_4Si_2$ is Cl=10.50% and N=8.29%. IR (neat; KBr plates): —CH— (of the pyridine ring) 3028, 685 cm$^{-1}$, Py 1655–1605 cm$^{-1}$, Si(CH$_3$)$_2$ 1260, 825 cm$^{-1}$, C—O—C 1080 cm$^{-1}$, Si—O—C 1000 cm$^{-1}$

Example 3

In a round-bottom chemical flask 4.33 g (0.0277 moles) of 4,4'-dipyridyl and 8 ml dimethylacetamide with 5 g (0.01107 moles) of bis(dichloromethylsilyl) pentaethyleneglycolether IV were heated for 100 hours at 60° C. Initially the solution darkened, then a brown deposit was formed from an acetone-hexane mixture (1:1 v/v). This deposit (organosilicon ammonium derivatives of 4,4'-dipyridyl VIII) was thoroughly washed with acetone and dried under vacuum in an exiccator. 2.14 g (0.028 moles) of the salt VIII with a melting temperature 103° C. were received in the form of an amorphous hygroscopic powder with a light brown color and which is soluble in water, dimethylsulfoxide, methanol and in aprotic solvents like propylene carbonate, but which is not soluble in aliphatic ethers or in ketones. The experimentally determined Cl content was 9.24%, N was 7.38%. The theoretical percentages for $C_{36}H_{52}Cl_2N_4O_6Si_2$ is Cl=9.28% and N=7.33%. IR (neat; KBr plates): —CH— (of the pyridine ring ) 3028, 680 cm$^{-1}$, Py 1650–1585 cm$^{-1}$, Si(CH$_3$)$_2$ 1255, 820 cm$^{-1}$, Si—CH$_3$ 800 cm$^{-1}$, Si—O—C 1010 cm$^{-1}$.

Example 4

The ionic conductivity of a liquid electrolyte based on the solvent PC (propylene carbonate) as a function of the concentration of the organosilicon ammonium derivative of 4,4'-dipyridyl (compound VIII) was compared to the ionic conductivity of PC as a function of the inorganic salt LiClO$_4$ concentration.

An AC bridge of the type R-5021 was used for the measurements and it was assumed that the impedance components were connected in series. From the frequency dependence of the impedance a working frequency f=80 kHz was selected. An experimental glass cell with parallel flat Pt electrodes was held in a thermostat. The specific conductivity was determined as $\chi$=K.G, where $\chi$ (Sm/cm) is the specific conductivity of the electrolyte, G(Sm) is the conductivity of the electrolyte in the cell, and K(cm$^{-1}$) is the cell's constant which was determined by using a standard 0.01 M KCl solution.

Figure 1:
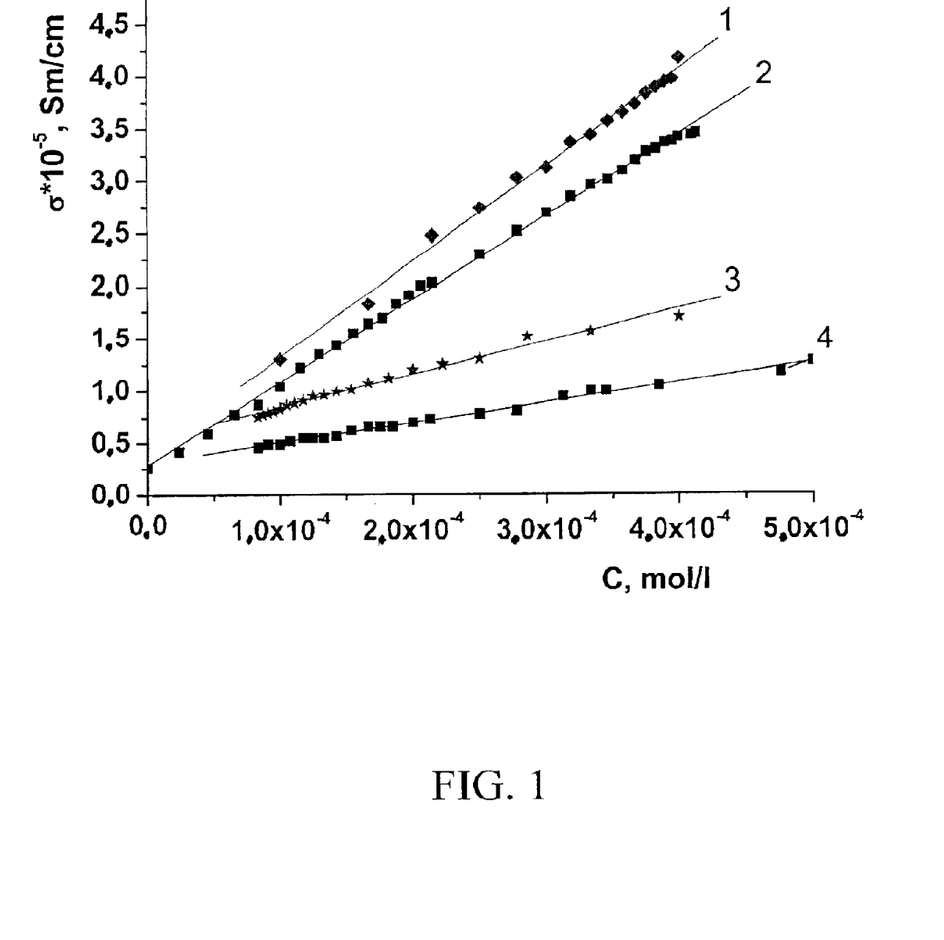
FIG. 1 shows a graph of the concentration dependence of the conductivity of $LiClO_4$ and the organosilicon ammonium derivative of 4,4'-dipyridyl (compound VIII) solutions in PC (propylene carbonate) at 25° C. and 17° C.

The ionic conductivity of PC as a function of concentration of additive VII is shown as curve 1 (25° C.) and curve 2 (17° C.). The ionic conductivity of PC as a function of LiClO$_4$ concentration is shown as curve 3 (25° C.) and curve 4 (17° C.). FIG. 1 clearly shows that the solutions of organosilicon salt VII in propylene carbonate show substantially higher ionic conductivity as compared to LiClO$_4$ ones at both temperatures measured. This data demonstrates that organosilicon ammonium derivatives described herein can be used as modifying additive for increasing the ionic conductivity of the electrolyte systems based on aprotic solvents.

Example 5

Polymer electrolytes were prepared with and without additives. The polymer electrolye without the additive was prepared in a mass ratio of 1:5:0.21 for C-PVC/PC/LiClO$_4$, respectively. The chlorine concentration in the Chlorinated PVC was 61.4%. The polymer electrolye with additive was prepared with additive VIII, in a mass ratio of 1:5:0.21:0.16 for C-PVC/PC/LiClO$_4$/additive, respectively.

The ionic conductivity as a function of storage time over five (5) days was measured by the method of impedance spectroscopy of symmetric Li/polymer electrolyte/Li systems in an atmosphere of dry argon in a polytetrafluoroethylene cell. A frequency range of 0.08–200 kHz was used. The ionic conductivity of polymer electrolytes was calculated on data for the total resistance (R$_e$) of the electrolyte measured from the intersection of the high-frequency part of the hodograph with the abscissa.

Figure 2:
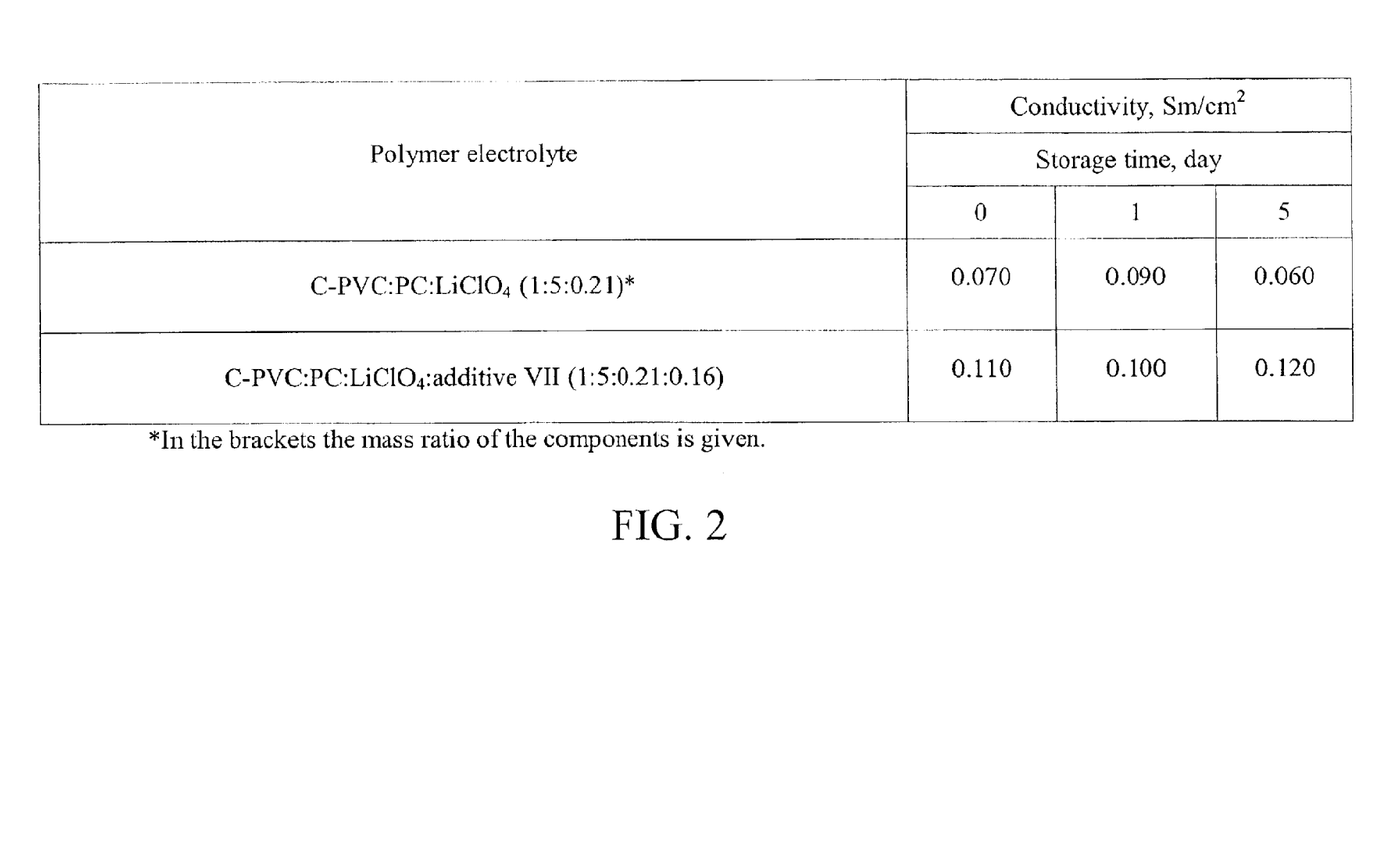
FIG. 2 is a table showing the time dependence of ionic conductivity of polymer electrolytes based on chlorinated polyvinyl chloride (C-PVC) in a Li-Li system with and without the addition of the additive compound VIII.

The results obtained are shown in FIG. 2. Upon formation (zero storage time) the electrolyte with the additive demonstrated an ionic conductivity of approximately 50% higher (0.110 Sm/cm$^2$ vs 0.070 Sm/cm$^2$) as compared to the corresponding electrolyte not having the additive. After 5 days of storage, the electrolyte including the additive demonstrated 100% more conductivity (0.120 Sm/cm$^2$ vs 0.060 Sm/cm$^2$) as compared to the corresponding electrolyte not having the additive. Thus, the electrolyte additives disclosed herein can provide an polymer electrolyte having higher ionic conductivity and improved stability when compared to the same electrolyte, but lacking the additive.

Example 6

Figure 3:
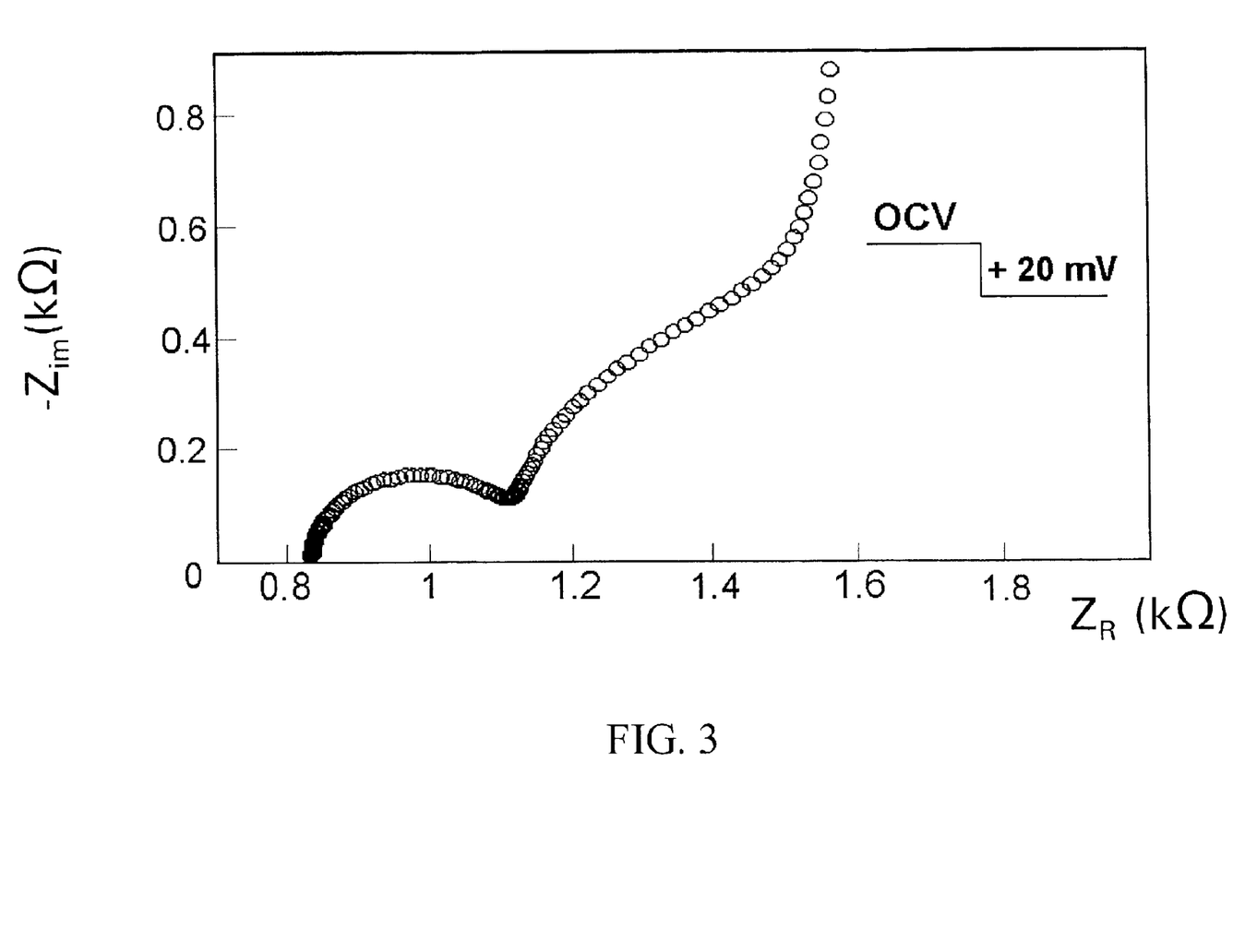
FIG. 3 is an impedance hodograph characterizing the internal resistance of a lithium-ion rechargeable battery at room temperature, the electrolyte not having an additive.

FIG. 3 is an impedance hodograph characterizing the internal resistance of a lithium-ion rechargeable battery having a LiMn$_2$O$_4$ cathode at room temperature. The impedance spectra were acquired in a frequency interval from $10^{-3}$ to $10^4$ Hz at a perturbation voltage 20 mV. The electrolyte was 1M LiClO$_4$ solution in EC/DMC (1:1 v/v). No additive was provided.

The battery was initially charged to a voltage of 4.5V, following storage for 2 days. Determinations of impedance characteristics were carried out using relaxation measurements. After switching the current off after charging and discharging, a voltage referred to as the open circuit voltage (OCV) is measured. This OCV actually gradually changes over time until a quasi-stationary OCV is setup.

After settling, a stepwise pulse of positive or negative voltage was applied to the battery. The current response resulting from the application of the voltage pulse is recorded. Hodograph parameters of the battery are calculated using known mathematical treatment of the relaxation characteristics of the time dependent current resulting from the pulse. The current relaxation function is approximated by any suitable function using a Laplace transformation. In most cases the sum of exponents shown below is suitable for this.

$$I(t) = \sum_j a_j \exp(-t/\tau_j)$$

Usually, to produce a satisfactory approximation 3–4 exponents (j=3–4) are sufficient. Then, the approximated function is transformed according to Laplace-Carson $$\bar{I}(p) = \sum_j a_j \frac{p \cdot \tau_j}{1 + p \cdot \tau_j}$$

Having divided the value of the effecting potential step by a current, the value of unknown impedance is obtained as a function of transformation parameter p.

$$\bar{Z}(p) = \frac{\Delta \varphi}{\bar{I}(p)}$$

The substitution of an imaginary variable iω for a parameter p allows to the expression for the frequency dependence of impedance to be written in the complex form shown below:

$$\bar{Z}(i\omega) = Re(\omega) + i \cdot Im(\omega)$$

This is the parametric equation of impedance hodograph, where ω is the angular frequency. It permits hodographs in a given frequency range to be obtained quickly.

In FIG. 3 (as well as FIGS. 4 and 5) the value of the voltage pulse on the battery and the direction of the voltage shift from the open circuit voltage (OCV) values are shown.

Figure 4:
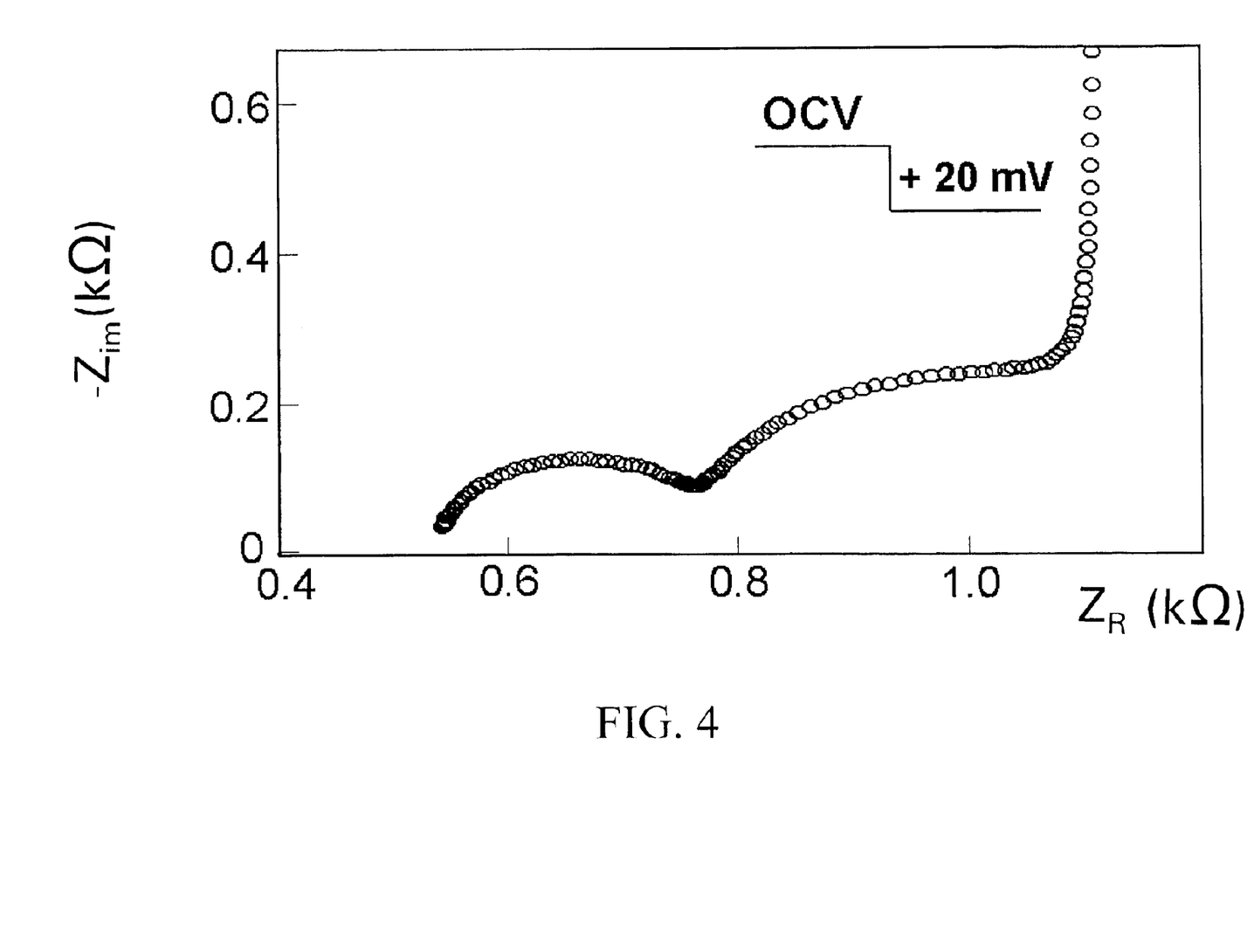
FIG. 4 is an impedance hodograph characterizing the internal resistance of a lithium-ion rechargeable battery at room temperature, the electrolyte having the additive compound VII.

FIG. 4 is a graph showing impedance characteristics of a lithium-ion rechargeable battery having a LiMn$_2$O$_4$ cathode at room temperature. The electrolyte was a 1M LiClO$_4$ solution in EC/DMC (1:1 v/v) with the salt LiClO$_4$ and $1 \times 10^{-3}$ mol/l of the additive compound VII. The battery was initially charged to a voltage 4.5V, following storage for 2 days. Comparing the data shown in FIG. 4 (additive) to the data shown in FIG. 3 (no additive), it is apparent that improved impedance characteristics resulted from the addition of additives described herein. The additives are believed to produce improved impedance characteristics and other improved parameters in part by providing a highly ion conductivity passivating film on the surface of lithium containing anodes.

Figure 5:
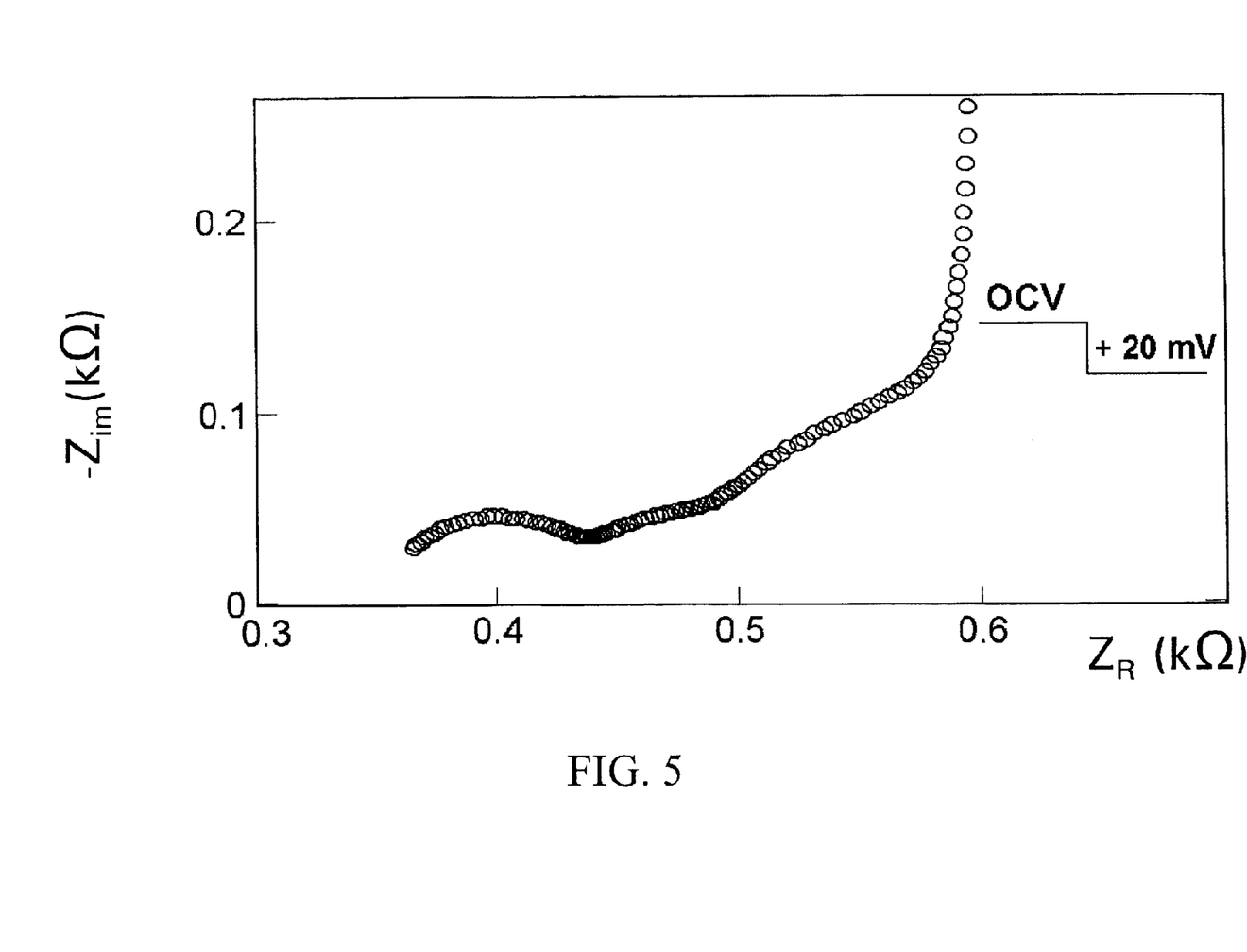
FIG. 5 is an impedance hodograph characterizing the internal resistance of a lithium-ion rechargeable batteries at room temperature, the electrolyte having the additive compound VIII.

FIG. 5 is a graph showing impedance characteristics of a lithium-ion rechargeable battery having a LiMn$_2$O$_4$ cathode at room temperature. The electrolyte was a 1M LiClO$_4$ solution in EC/DMC (1:1 v/v) with $1 \times 10^{-1}$ mol/l of the compound VIII. The battery was initially charged to a voltage of 4.5V, following storage for 2 days. Impedance results using the electrolyte including additive compound VIII were found to be similar to the improvements provided by use of additive compound VII as shown in FIG. 4.

Example 7

A rechargeable coin 2016 size battery of the C-LiMn$_2$O$_4$ system was assembled by interposing layers of an anode consisting of 0.01 g graphite pressed into the cover, a porous polypropylene separator impregnated with liquid electrolytes based on 1M LiClO$_4$ solution in EC/DMC (1:1 v/v) containing $1 \times 10^{-3}$ mol/l additive based on the organosilicon ammonium derivative of 4,4'-dipyridyl (VII or VIII), and a cathode consisting of 0.0495 g in accordance with the stoichiometric balance of a mixture of LiMn$_2$O$_4$ (80 wt %), carbon black (5 wt %), graphite (5 wt %) and a binder suspension of the fluorinated polymer binder PVdF 20810 (Solvay) (10 wt %) pressed into the cell's cup. The battery was cycled at 20±2° C. between 3.0 and 4.35 V with a current 0.1 mA during discharge and 0.1 mA during charging.

Figure 6:
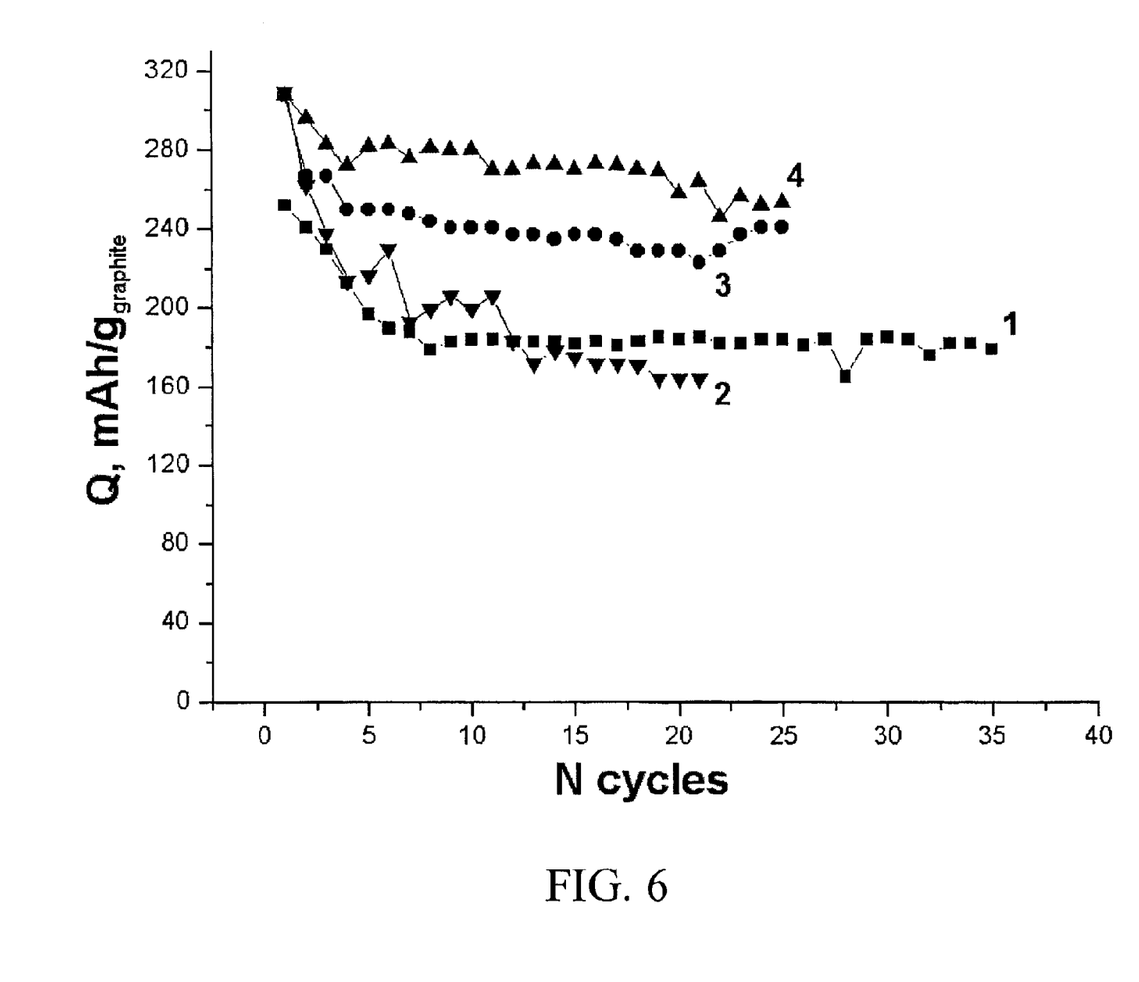
FIG. 6 is a graph showing the change in specific discharge capacity of a graphite anode during cycling of a lithium-ion rechargeable battery shown with and without various additives.

FIG. 6 shows the change in specific discharge capacity of the graphite anode during cycling of the lithium-ion rechargeable battery described above with and without additives. Curve 1 shows a cell having no additive. The cell shown in curve (2) included compound V, the cell shown in curve (3) included compound VII while the cell shown in curve (4) included compound VIII. $Q_{cat}/Q_{an}=2.0/1.0$. This capacity ratio was calculated on the basis of material balance with allowance for electrochemical cathode/anode characteristics. Such an approach allows cycling of graphite anode to be provided in the potential range corresponding to lithium intercalations in graphite.

Compounds VII (3) and VIII (4) produce substantially higher discharge capacity, even after approximately 25 cycles, as compared to the cell without the additive.

Figure 7:
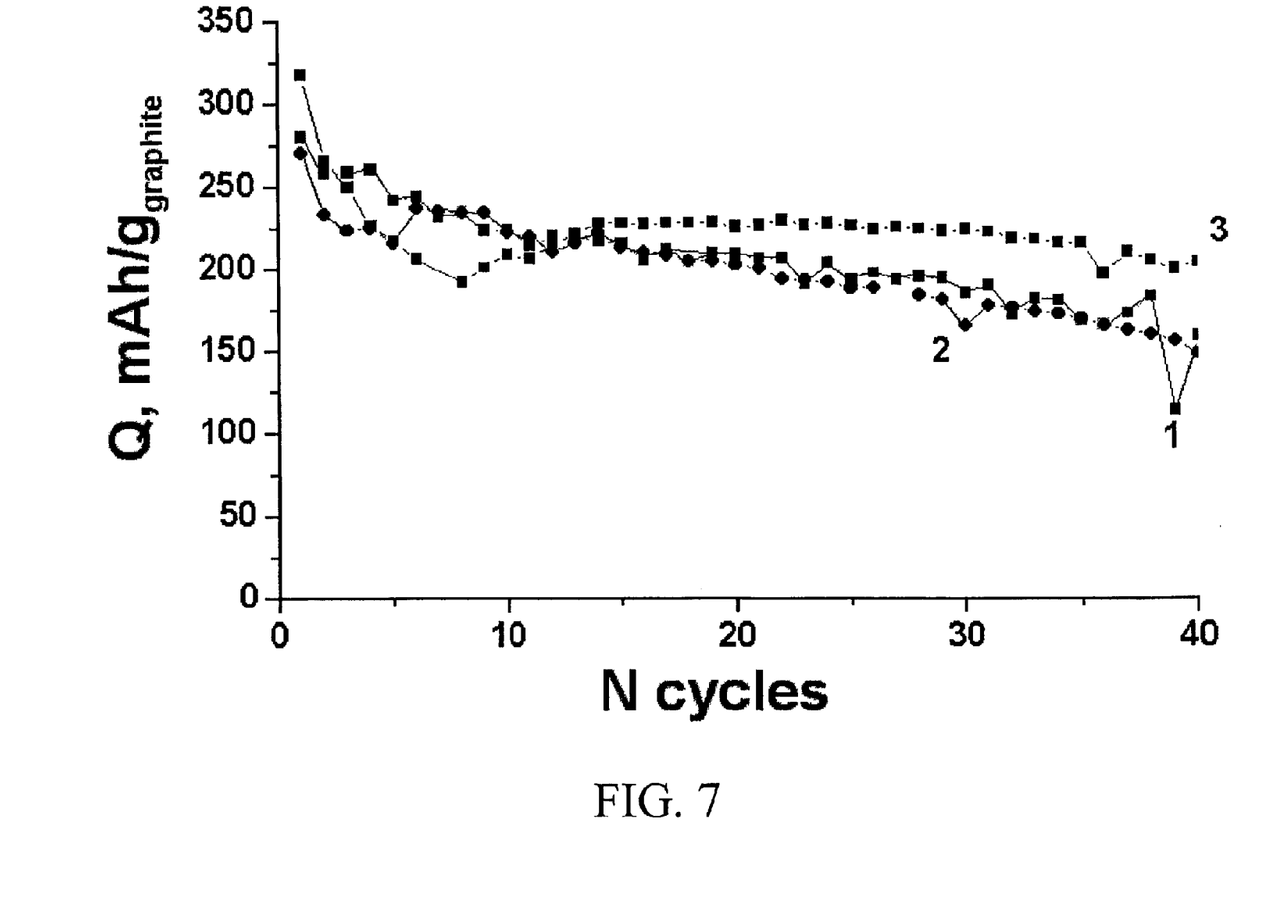
FIG. 7 is a graph that shows the change of specific discharge capacity of a graphite anode during cycling of a lithium-ion rechargeable battery shown with and without various additives.

FIG. 7 is a graph that shows the change of specific discharge capacity of a graphite anode during cycling of a lithium-ion rechargeable battery having a LiMn$_2$O$_4$ cathode. The electrolyte was a 1M EC/DMC (1:1 v/v) solution of LiClO$_4$ having added thereto no additive (1), compound VII (2), or compound VIII (3). $Q_{cat}/Q_{an}=1.6/1.0$. The concentration of additives was $1 \times 10^{-3}$ mol/l. Compound VIII (3) provided higher and significantly more stable specific discharge capacity for the graphite anode during cycling.

Example 8

A rechargeable coin 2016 size battery of the system Li—LiMn$_2$O$_4$ was assembled by interposing layers of an anode in the form of metallic lithium. A porous polypropylene separator was soaked with a liquid electrolyte based on a solution of 1M LiClO$_4$ in EC/DMC (1:1 v/v). A cathode prepared from a mixture of LiMn$_2$O$_4$ (80 wt %), carbon black (5 wt %), graphite (5 wt %) and a binder suspension of the fluorinated polymer PVdF 20810 (Solvay) 10 wt % was pressed into the cell's cup.

Batteries were formed with and without an organosilicon additive for electrical testing. The battery with the additive included $1 \times 10^{-3}$ mol/l of additive VIII, additive VIII based on an organosilicon ammonium derivative of 4,4'-dipyridyl.

Figure 8:
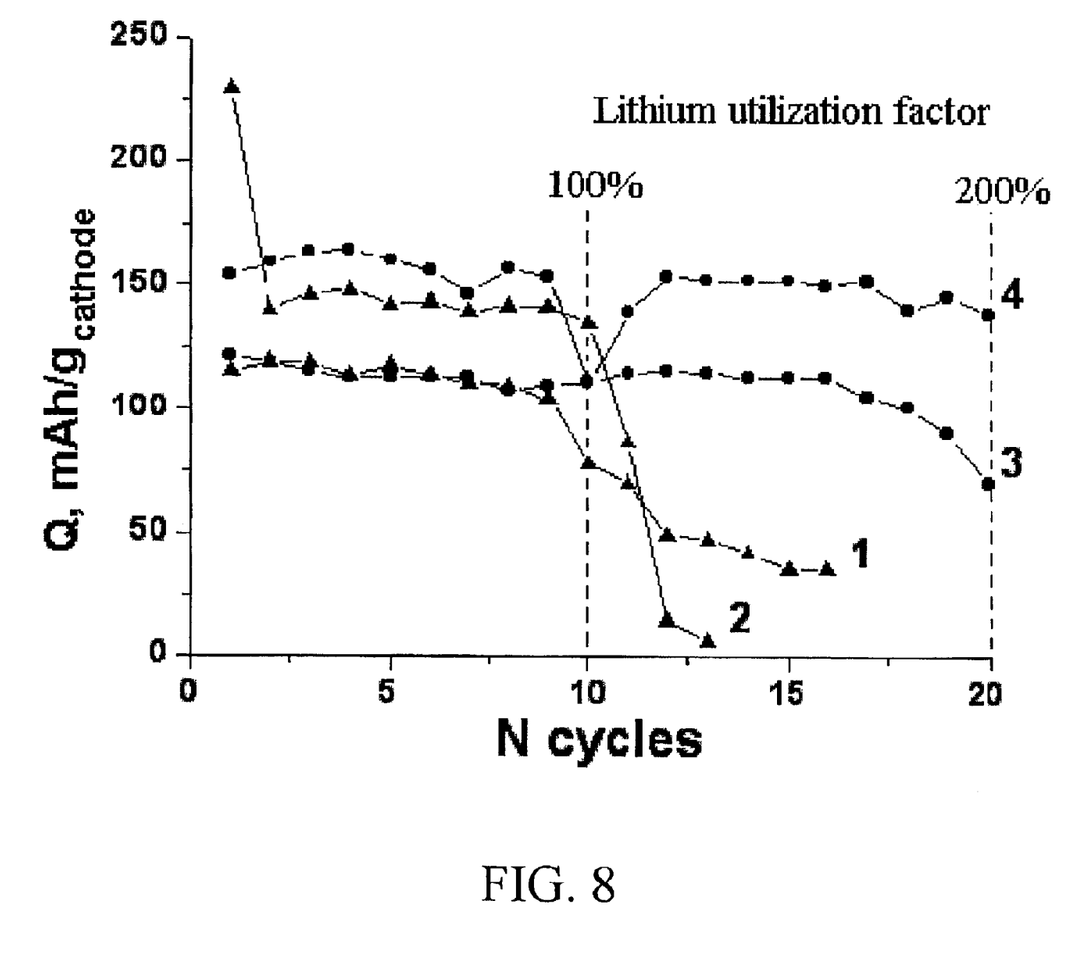
FIG. 8 is a graph that shows the effect of additives on the lithium cycling efficiency of rechargeable batteries.

The batteries were cycled at 20±2° C. between 3.0 and 4.35 V with a current 0.5 mA during discharge and 0.2 mA during charging. FIG. 8 shows the results of tests performed. Curve 1 shows cycling characteristics of the Li—LiMn$_2$O$_4$ battery which did not include the additive VIII, while curve 3 shows the cycling characteristics of the Li—LiMn$_2$O$_4$ battery which included the additive VII. Comparing curve 3 (additive) to curve 1 (no additive), it is clear that compound VIII significantly improved the cycling efficiency of the lithium battery tested.

Example 9

A rechargeable 2016 size battery of the system Li—MnO$_2$ was assembled by interposing layers of an anode in the form of metallic lithium. A porous polypropylene separator soaked with liquid electrolytes based on a solution of 1M LiClO$_4$ in EC/DMC (1:1 v/v). A cathode prepared from a mixture of MnO$_2$ (80 wt %), carbon black (5 wt %), graphite (5 wt %) and a binder suspension of the fluorinated polymer PVdF 20810 (Solvay) 10 wt % pressed into the cell's cup.

Batteries were formed with and without an organosilicon additive for electrical testing. The battery with the additive included $1 \times 10^{-3}$ mol/l of additive VIII, additive VIII based on an organosilicon ammonium derivative of 4,4'-dipyridyl.

The batteries were cycled at 20±2° C. between 3.0 and 4.35 V with a current 0.5 mA during discharge and 0.2 mA during charging. FIG. 8 shows the results of tests performed. Curve 2 shows cycling characteristics of the Li—MnO$_2$ battery which did not include the additive VIII, while curve 4 shows the cycling characteristics of the Li—MnO$_2$ battery which included the additive VIII. Comparing curve 4 (additive) to curve 2 (no additive), it is clear that compound VIII significantly improved the cycling efficiency of the lithium battery tested.

We claim:

1. An nonaqueous electrolyte, comprising:
   an aprotic solvent,
   a salt of an alkali metal, and
   an additive, said additive including a organosilicon backbone including at least one ethylene oxide (CH$_2$CH$_2$O) unit, and
   at least two pyridinium groups bound said backbone, said pyridinium groups each bound to at least one halogen ions or halogen-containing anion.

2. The electrolyte of claim 1, wherein said additive has the following general structure:

where n is an integer from 1 to 9, X$^-$ is at least one selected from the group consisting of Cl$^-$, Br$^-$, I$^-$, ClO$_4^-$, BF$_4^-$, AsF$_6^-$, PF$_6^-$, CF$_3$SO$_3^-$, CF$_3$CF$_2$CF$_2$SO$_3^-$ and N(SO$_2$CF$_3$)$_2^-$ and R$_1$ are aliphatic or aromatic hydrocarbons, R$_2$ and R$_3$ are selected from the group consisting of hydrocarbons, hydrogen and nitrogen containing heterocyclic substituents.

3. The electrolyte of claim 2, wherein said additive includes at least one R$_1$, R$_2$, R$_3$ combination selected from the group consisting of:
   a) R$_1$=CH$_3$, R$_2$=R$_3$=H;
   b) R$_1$=CH$_3$, R$_2$=2-CH$_3$, R$_3$=H;
   c) R$_1$=CH$_3$, R$_2$=4-CH$_3$, R$_3$=H;
   d) R$_1$=CH$_3$, R$_2$=5-(CH$_2$=CH—), R$_3$=2-CH$_3$;
   e) R$_1$=CH$_3$, R$_2$=4-(CH$_2$=CH—), R$_3$=H;
   f) R$_1$=CH$_3$, R$_2$=4-C$_5$H$_4$N, R$_3$=H;
   g) R$_1$=C$_6$H$_5$, R$_2$=R$_3$=H;
   h) R$_1$=C$_6$H$_5$, R$_2$=2-CH$_3$, R$_3$=H;
   i) R$_1$=C$_6$H$_5$, R$_2$=4-CH$_3$, R$_3$=H;
   j) R$_1$=C$_6$H$_5$, R$_2$=5-(CH$_2$=CH—), R$_3$=2-CH$_3$;
   k) R$_1$=C$_6$H$_5$, R$_2$=4-(CH$_2$=CH—), R$_3$=H;
   l) R$_1$=C$_6$H$_5$, R$_2$=4-C$_5$H$_4$N, R$_3$=H.

4. The electrolyte of claim 1, wherein said aprotic solvent comprises at least one selected from the group consisting of acetonitrile, dimethylformamide, dimethylsulfoxide, propylene carbonate, ethylene carbonate, dimethyl carbonate, bis(2-methoxyethyl) ether, gamma butyrolactone, 1,3-dioxolane, dimethoxyethane and sulfolane.

5. The electrolyte of claim 1, wherein said salt comprises at least one selected from the group consisting of LiPF$_6$, LiClO$_4$, LiBF$_4$, LiAsF$_6$, LiCF$_3$SO$_3$, and LiN(SO$_2$CF$_3$)$_2$.

6. The electrolyte of claim 1, wherein 3 to 10 weight percent of said electrolyte is said salt.

7. The electrolyte of claim 1, wherein 0.05 to 5 weight percent of said electrolyte is said additive.

8. The electrolyte of claim 1, further comprising a polymeric material.

9. The electrolyte of claim 8, wherein said polymeric material comprises a halogen-containing polymer.

10. The electrolyte of claim 9, wherein said halogen-containing polymer is at least one selected from the group consisting of polyvinyl chloride, chlorinated polyvinyl chloride and polyvinylidene fluoride.

11. The electrolyte of claim 8, wherein said polymeric material is 10 to 40 weight percent of said electrolyte.

12. The electrolyte of claim 8, wherein 40 to 82 weight percent of said electrolyte is said aprotic solvent.

13. An electrochemical cell comprising:
   an alkali metal or alkali metal ion containing anode;
   a cathode; and
   an electrolyte, said electrolyte selected from the electrolyte of claim 1 or the electrolyte of claim 8.

14. The electrochemical cell of claim 13, wherein said cell is rechargeable.

15. The electrochemical cell of claim 13, wherein said anode includes said alkali metal, said alkali metal including lithium metal.

16. The electrochemical cell of claim 13, wherein said anode includes said alkali metal, said alkali metal containing anode including an alloying metal.

17. The electrochemical cell of claim 16, wherein said alkali metal containing anode including an alloying metal is selected from the group consisting of lithium-aluminum, lithium-aluminum-silicon, lithium-aluminum-cadmium, lithium-aluminum-bismuth and lithium-aluminum-tin.

18. The electrochemical cell of claim 13, wherein said anode includes said alkali metal ion containing anode, said anode including graphite.

19. The electrochemical cell of claim 13, wherein said cathode comprises a metal oxide.

20. The electrochemical cell of claim 19, wherein said metal oxide is a lithium-transition metal oxide.

21. The electrochemical cell of claim 20, wherein said metal oxide is at least one selected from the group consisting of $MnO_2$, $LiMn_2O_4$, $LiCoO_2$, $LiNiO_2$, $V_2O_5$ and $V_6O_{13}$.

22. A method of making a liquid electrolyte, comprising the steps of:
   providing an aprotic solvent, a salt of an alkali metal and an additive, said additive including:
   a organosilicon backbone including at least one ethylene oxide ($CH_2CH_2O$) unit,
   at least two pyridinium groups bound to said backbone, said pyridinium groups each bound to at least one halogen ion or halogen-containing anion, and
   mixing together said additive, said aprotic solvent and said salt.

23. A method of making a polymer electrolyte, comprising the steps of:
   providing a polymeric material, an aprotic solvent, a salt of an alkali metal and an additive, said additive including:
   a organosilicon backbone including at least one ethylene oxide ($CH_2CH_2O$) unit,
   at least two pyridinium groups bound to said backbone, said pyridinium groups each bound to at least one halogen ion or halogen-containing anion; and
   mixing together said additive, said polymeric material, said aprotic solvent and said salt.

24. A method of making an electrochemical cell comprising the steps of:
   providing an anode comprising an alkali metal or an alkali ion;
   providing a cathode;
   operatively associating an nonaqueous electrolyte with said anode and cathode, said nonaqueous electrolyte comprising at least one ion-forming alkali salt; and
   dissolving and additive into said electrolyte, said additive including:
   a organosilicon backbone including at least one ethylene oxide ($CH_2CH_2O$) unit,
   at least two pyridinium groups bound to said backbone, said pyridinium groups each bound to at least one halogen ion or halogen-containing anion, and
   mixing together said additive, said polymeric material, said aprotic solvent and said salt.

* * * * *